(12) United States Patent
Barnes et al.

(10) Patent No.: US 11,337,878 B1
(45) Date of Patent: May 24, 2022

(54) MECHANICAL JOINT FOR EXOSKELETON ANKLE

(71) Applicant: Lockheed Martin Corporation, Bethesda, MD (US)

(72) Inventors: Gavin A. Barnes, St. Cloud, FL (US); Evan M. Herndon, Groveland, FL (US); Shuoran Qu, Titusville, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 231 days.

(21) Appl. No.: 16/844,695

(22) Filed: Apr. 9, 2020

Related U.S. Application Data

(60) Provisional application No. 62/832,002, filed on Apr. 10, 2019.

(51) Int. Cl.
*A61H 3/00* (2006.01)
*A61H 1/02* (2006.01)

(52) U.S. Cl.
CPC .............. *A61H 1/0266* (2013.01); *A61H 3/00* (2013.01); *A61H 2003/007* (2013.01)

(58) Field of Classification Search
CPC ... A61H 1/0266; A61H 3/00; A61H 2003/007
See application file for complete search history.

(56) References Cited

U.S. PATENT DOCUMENTS

| | | | |
|---|---|---|---|
| 3,268,927 A | 8/1966 | Markowitz | |
| 5,471,405 A | 11/1995 | Marsh | |
| 8,060,945 B2 | 11/2011 | Adarraga | |
| 8,307,572 B2 | 11/2012 | Foxen et al. | |
| 9,662,262 B2 | 5/2017 | Hollander et al. | |
| 9,808,073 B1 | 11/2017 | Maxwell et al. | |

(Continued)

FOREIGN PATENT DOCUMENTS

| JP | 2018524065 A | 8/2018 |
|---|---|---|
| JP | 6466420 B2 | 2/2019 |

(Continued)

OTHER PUBLICATIONS

Non-Final Office Action for U.S. Appl. No. 15/359,806, dated Nov. 16, 2018, 12 pages.

(Continued)

*Primary Examiner* — Jerrah Edwards
*Assistant Examiner* — Aren Patel
(74) *Attorney, Agent, or Firm* — Withrow & Terranova, PLLC (57) ABSTRACT

Disclosed herein is a mechanical joint for an exoskeleton ankle. The mechanical joint includes a first connector (e.g., to attach to a foot), a second connector (e.g., to attach to a leg), a stack of at least partially nested cones between the first connector and the second connector (e.g., at an outstep of the foot), and a strand extending through the second connector and the cone stack. The second connector is configured to freely translate away from the first connector and freely tilt relative to the first connector. Similarly, the second cone is configured to freely translate away from the first cone along the strand and freely tilt relative to the first cone. Accordingly, the mechanical joint provides vertical support (e.g., of an exoskeleton structure) while minimizing angular resistance (e.g., about an ankle joint).

20 Claims, 10 Drawing Sheets

(56) References Cited

U.S. PATENT DOCUMENTS

| | | |
|---|---|---|
| 10,124,484 B1 | 11/2018 | Barnes |
| 10,548,800 B1 | 2/2020 | Barnes |
| 10,561,568 B1 | 2/2020 | Maxwell et al. |
| 2004/0237351 A1 | 12/2004 | Howell |
| 2009/0299489 A1* | 12/2009 | Gramnaes ................ A61F 2/64 |
| | | 623/27 |
| 2010/0210980 A1 | 8/2010 | Kudoh |
| 2012/0073165 A1 | 3/2012 | McKeown |
| 2012/0192461 A1 | 8/2012 | Backus |
| 2016/0067550 A1 | 3/2016 | Breach et al. |
| 2017/0014297 A1 | 1/2017 | Grygorowicz et al. |
| 2020/0315817 A1* | 10/2020 | Kaitan .................. A61F 2/604 |
| 2021/0251781 A1* | 8/2021 | Battlogg .................. A61F 2/70 |

FOREIGN PATENT DOCUMENTS

| | | |
|---|---|---|
| WO | 2013049658 A1 | 4/2013 |
| WO | 2016162425 A1 | 10/2016 |
| WO | 2017069605 A1 | 4/2017 |

OTHER PUBLICATIONS

Final Office Action for U.S. Appl. No. 15/359,806, dated May 31, 2019, 14 pages.

Non-Final Office Action for U.S. Appl. No. 15/359,806, dated Apr. 1, 2020, 12 pages.

Applicant-Initiated Interview Summary for U.S. Appl. No. 15/359,806, dated Jun. 23, 2020, 6 pages.

Notice of Allowance for U.S. Appl. No. 15/359,806, dated Oct. 5, 2020, 7 pages.

* cited by examiner

MECHANICAL JOINT FOR EXOSKELETON ANKLE

RELATED APPLICATIONS

This application claims the benefit of U.S. Provisional Application No. 62/832,002, filed on Apr. 10, 2019, entitled "MECHANICAL JOINT FOR EXOSKELETON ANKLE," the disclosure of which is hereby incorporated herein by reference in its entirety.

TECHNICAL FIELD

The embodiments relate to mechanical joints, and in particular, to a mechanical joint for an exoskeleton ankle.

BACKGROUND

An exoskeleton is a device external to a user, which provides support and/or protection (e.g., increased strength). Exoskeletons may be mounted to and worn by a user in a variety of ways. However, exoskeletons without ground contact can slide down and out of alignment with a user's anatomical joints. For example, an exoskeleton may include a leg portion mounted to a shin and a hinge aligned with a user's knee. However, because of the weight of the exoskeleton, the weight of the load, and/or shifting from use, the hinge may slip out of alignment with the user's knee.

Exoskeletons with ground contact may prevent such misalignment and provide a load transfer path for an exoskeleton structure to the ground. However, such exoskeletons may also induce resistance to ankle movement, which may undesirably impact a user's energy and comfort. What is needed is a mechanical joint which provides vertical support while simultaneously minimizing angular resistance about an ankle joint.

SUMMARY

Disclosed herein is a mechanical joint for an exoskeleton ankle. The mechanical joint includes a first connector (e.g., to attach to a foot), a second connector (e.g., to attach to a leg), a stack of at least partially nested cones between the first connector and the second connector (e.g., at an outstep of the foot), and a strand extending through the second connector and the cone stack. The second connector is configured to freely translate away from the first connector and freely tilt relative to the first connector. Similarly, the second cone is configured to freely translate away from the first cone along the strand and freely tilt relative to the first cone. Accordingly, the mechanical joint provides vertical support (e.g., of an exoskeleton structure) while minimizing angular resistance (e.g., about an ankle joint).

In one embodiment, the mechanical joint includes a first connector, a second connector, a cone stack positioned between the first connector and the second connector, and a strand. The cone stack includes a first cone and a second cone, the first cone at least partially nested within the first cone. The strand extends through the second connector, the first cone, and the second cone. The second connector is configured to freely translate away from the first connector. The second cone is configured to freely translate away from the first cone along the strand. The second connector is configured to freely tilt relative to the first connector. The second cone is configured to freely tilt relative to the first cone.

In another embodiment, an exoskeleton ankle includes a first connector, a second connector, a cone stack positioned between the first connector and the second connector, and a strand. The cone stack includes a first cone and a second cone, the first cone at least partially nested within the first cone. The strand extends through the second connector, the first cone, and the second cone. The second connector is configured to freely translate away from the first connector. The second cone is configured to freely translate away from the first cone along the strand. The second connector is configured to freely tilt relative to the first connector. The second cone is configured to freely tilt relative to the first cone.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first format" and "second format," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The use herein of "annular" means surrounding, which may include circular shapes or any other type of shape.

The use herein of "proximate" means at, next to, or near.

As used herein, "twist" includes rotation about or around an axis.

As used herein, "tilt" includes non-coaxial rotation of an axis (e.g., where angles between two different axes change). In other words, "tilting" includes rotations other than "twisting."

Figure 1:
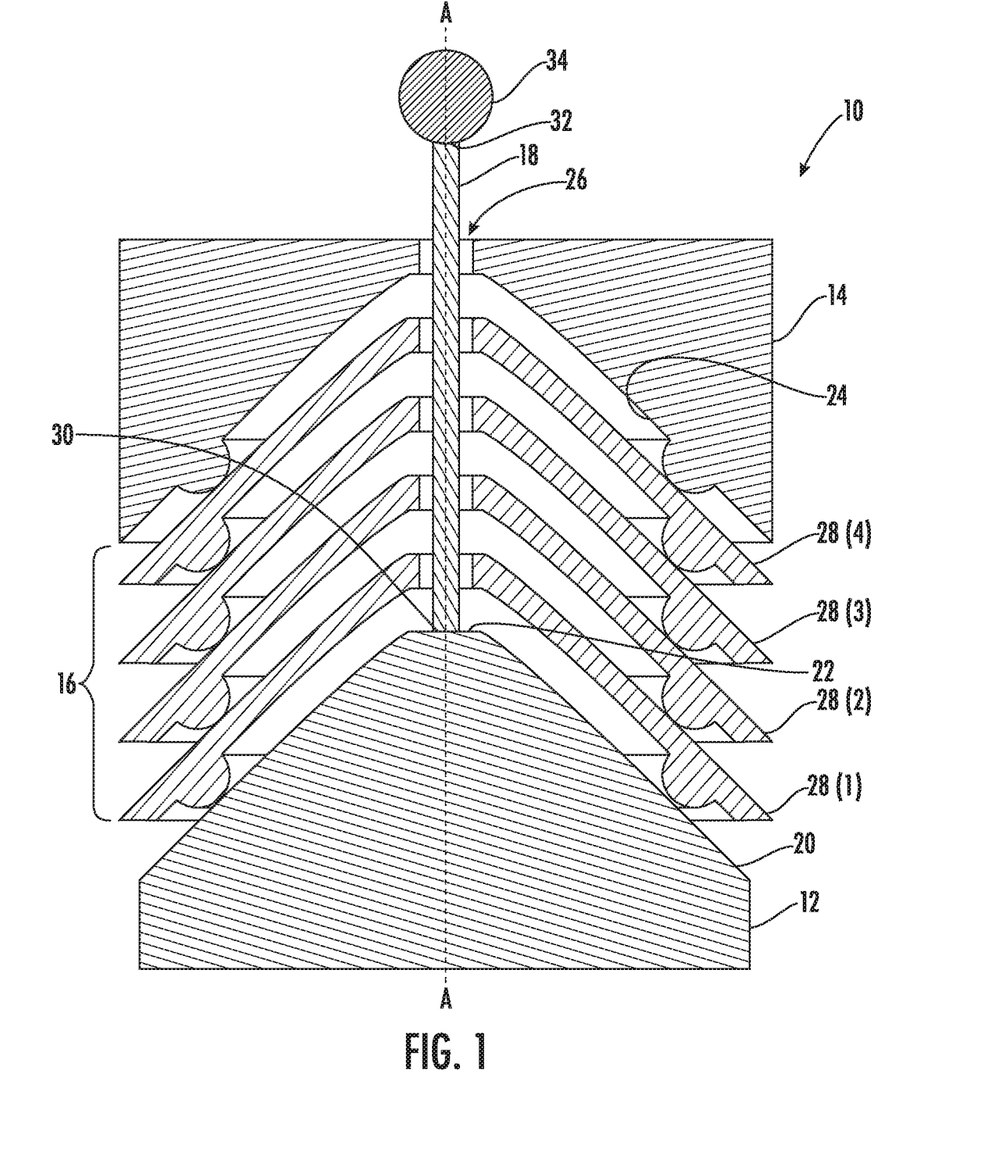
FIG. 1 is a cross-sectional side view of a mechanical joint.

FIG. 1 is a cross-sectional side view of a mechanical joint 10 (may also be referred to as a compression resistant mechanical joint) including a bottom connector 12 (may also be referred to as a first connector, lower connector, base connector, etc.), a top connector 14 (may also be referred to as a second connector, upper connector, cap connector, etc.), a cone stack 16 (may also be referred to as a stack, stack of cones, etc.) positioned between the bottom connector 12 and the top connector 14, and a strand 18 (e.g., spring loaded cable, rope, etc.) extending through the cone stack 16 (e.g., to prevent separation of the cone stack 16 from the bottom connector 12 and the top connector 14). The cone stack 16 provides vertical support and compressive articulation of the top connector 14 relative to the bottom connector 12.

The top connector 14 is configured to move relative to the bottom connector 12. In particular, the top connector 14 is configured to freely translate away from the bottom connector 12 (e.g., along axis A). The top connector 14 is configured to freely rotate (e.g., tilt, twist) relative to the bottom connector 12 (e.g., about axis A). The top connector 14 is configured to tilt relative to the bottom connector 12 under compression. The mechanical joint 10 provides vertical support (e.g., of an exoskeleton structure) while minimizing angular resistance (e.g., about an ankle joint).

The bottom connector 12 includes a conical outer surface 20 and an apex 22. The cone stack 16 is positioned on top of the bottom connector 12. The top connector 14 includes a conical inner surface 24 and defines a through hole 26. The cone stack 16 includes a plurality of cones 28(1)-28(4) (generally referred to herein collectively as cones 28 and individually as cone 28) at least partially nested within each other. The bottom connector 12 is at least partially nested within the first cone 28(1). The fourth cone 28(4) is at least partially nested within the top connector 14.

The strand 18 includes a first end 30 attached to the bottom connector 12 and a second end 32 proximate the top connector 14. The first end 30 of the strand 18 is attached to the bottom connector 12 to prevent movement of the second end 32 of the strand 18 relative to the bottom connector 12. The strand 18 includes a stopper 34 at the second end to prevent disengagement with the top connector 14. In certain embodiments, the stopper 34 is embodied as a spherical ball. In other embodiments, the stopper 34 is embodied as a disc. A width of the stopper 34 is larger than a width of the through hole 26 of the top connector 14 to prevent disengagement of the strand 18 from the top connector 14. The strand 18 extends through the cone stack 16 (i.e., through each of the plurality of cones 28), including the first cone 28(1) and the second cone 28(2). The strand 18 maintains alignment of the cones 28 in the cone stack 16, and prevents the cones 28 from accidental separation. The mechanical joint 10 is configured to allow movement of the second end 32 of the strand 18 relative to the top connector 14.

In certain embodiments, the bottom connector 12 is hollow and the strand 18 is attached to the top connector 14 with the stopper 34 positioned within the hollow of the bottom connector 12. In certain embodiments, the strand 18 is not attached to either the bottom connector 12 or the top connector 14, but instead includes two stoppers, one positioned proximate the bottom connector 12 and the other positioned proximate the top connector 14.

Figure 2A:
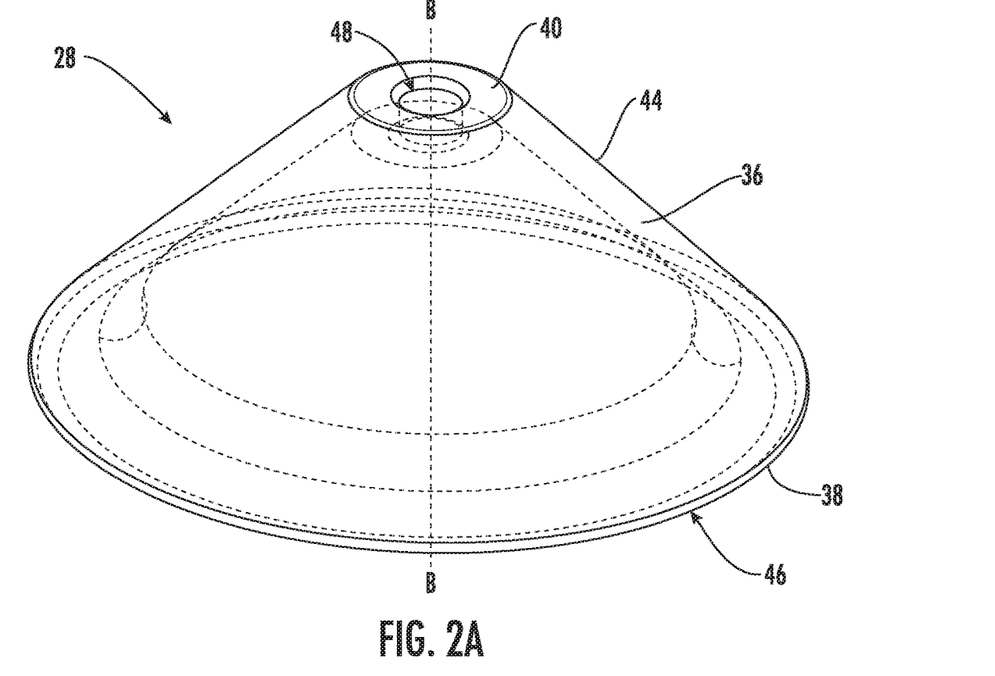
FIG. 2A is a perspective view of a cone of a cone stack of the mechanical joint of FIG. 1.
Figure 2B:
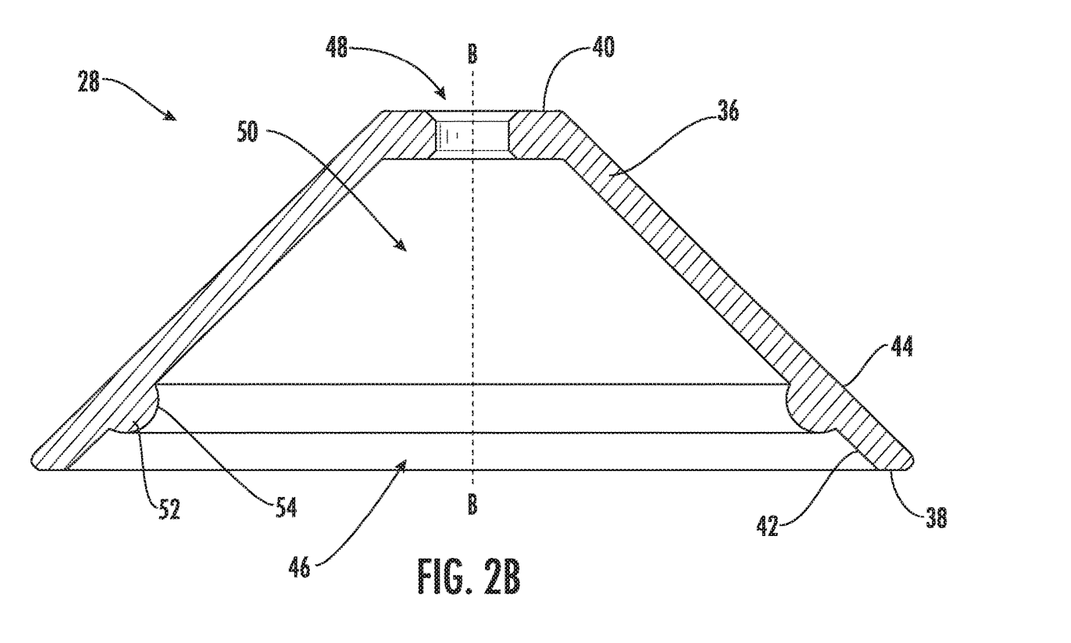
FIG. 2B is a cross-sectional side view of the cone of FIG. 2A.

FIGS. 2A and 2B are views of the cone 28 of the cone stack 16 of the mechanical joint 10. In certain embodiments, each cone 28 in the cone stack 16 is the same (e.g., for ease of manufacturability). Accordingly, features discussed herein with respect to the cone 28 also apply to any other cones 28 in the stack 16.

Each cone 28 includes a wall 36 defining a lower rim 38, an upper rim 40, an inner surface 42, and an outer surface 44. Each of the inner surface 42 and the outer surface 44 includes a tapered conical surface. The lower rim 38 of the wall 36 defines a base hole 46. The upper rim 40 of the wall 36 defines an apex hole 48 opposite the base hole 46. The wall 36 of the cone 28 defines an interior 50 between the lower rim 38 and the upper rim 40. Further, the wall 36 defines a central axis B extending between the base hole 46 and the apex hole 48. The strand 18 (see FIG. 1) extends through the base hole 46 and the apex hole 48 for each cone 28 in the stack 16.

The cone 28 includes at least one spacer 52 at the inner surface 42 of the wall 36 between the lower rim 38 and the upper rim 40. In certain embodiments, the at least one spacer 52 is an annular spacer and extends circularly around the axis B. Further, the at least one spacer 52 is positioned proximate the lower rim 38. The at least one first spacer 52 offsets surfaces 42, 44 of the cones 28 nested within each other. The at least one spacer 52 comprises a convex rounded surface 54 configured to contact the outer surface 44 of another cone 28 to facilitate tilting movement of the cones 28 relative to each other. The convex rounded surface 54 reduces the contact surface between the cones 28 while also reducing stress concentrations from a compressive force between the cones 28.

Figure 3:
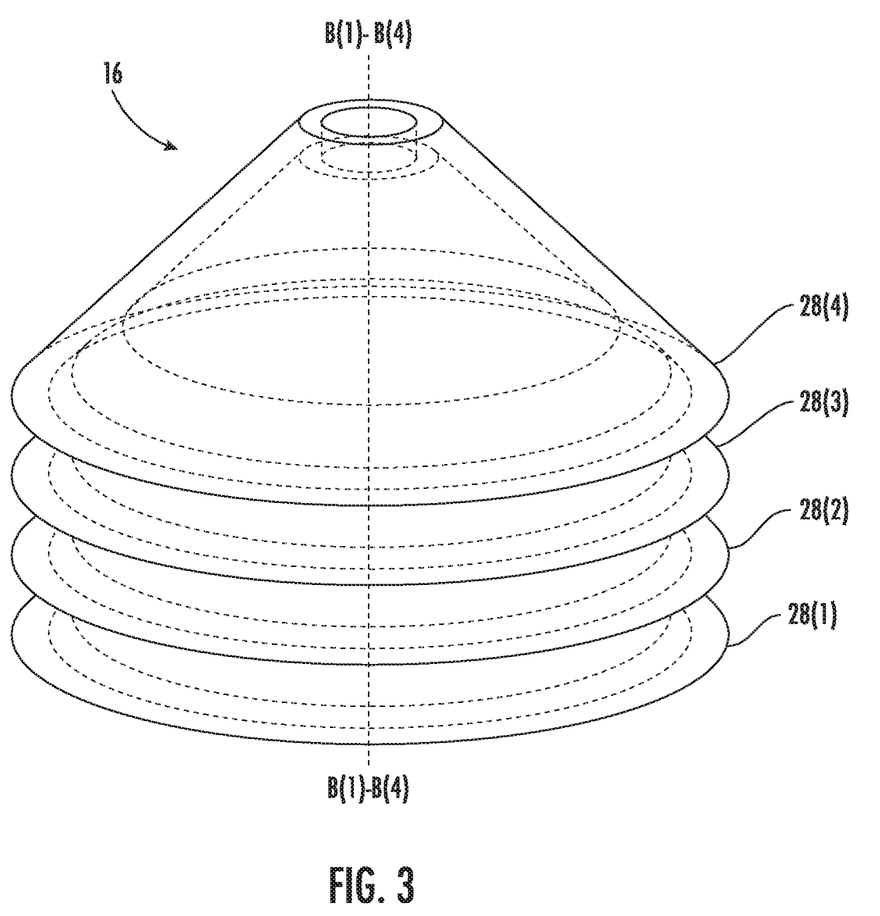
FIG. 3 is a perspective view of the cone stack of the mechanical joint of FIG. 1.

FIG. 3 is a perspective view of the cone stack 16 of the mechanical joint 10. As illustrated, each cone 28 can be stacked upon one another to form the cone stack 16. In a stacked configuration, the cone stack 16 includes a plurality of cones 28, including the first cone 28(1), second cone 28(2), third cone 28(3), and fourth cone 28(4). The first cone 28(1) is at least partially nested within the second cone 28(2). In particular, the upper rim 40 of the first cone 28(1) is positioned within the interior 50 of the second cone 28(2) (see FIGS. 2A-2B). Similarly, the second cone 28(2) is at least partially nested within the third cone 28(3) and the third cone 28(3) is at least partially nested within the fourth cone 28(4). Although the cone stack 16 includes four cones 28, in other embodiments, the cone stack 16 could include fewer or more cones 28 as needed (e.g., depending on needed height of the cone stack 16, needed angular articulation, etc.).

Figure 4A:
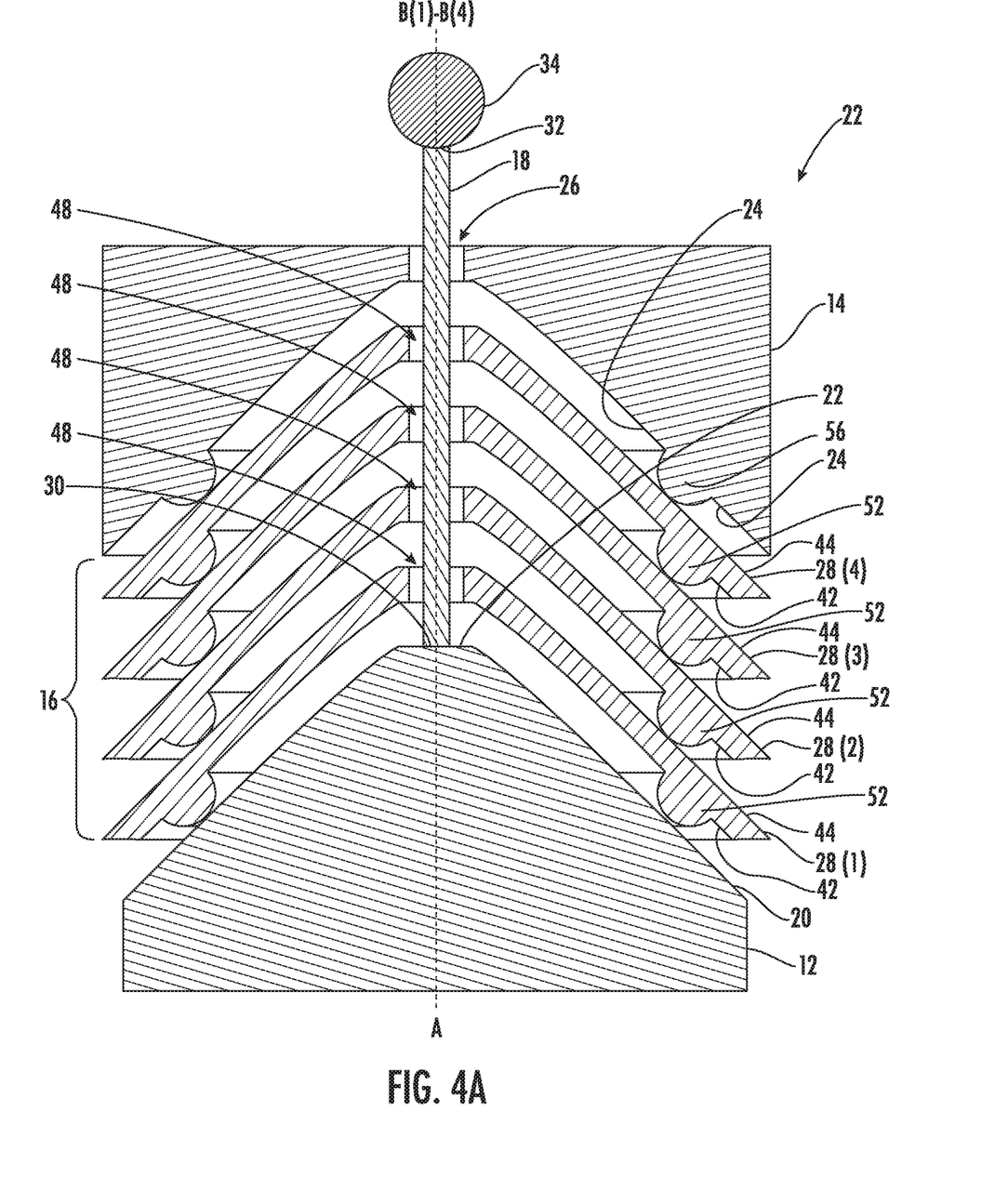
FIG. 4A is a cross-sectional side view of the mechanical joint of FIG. 1 in a straight orientation.
Figure 4B:
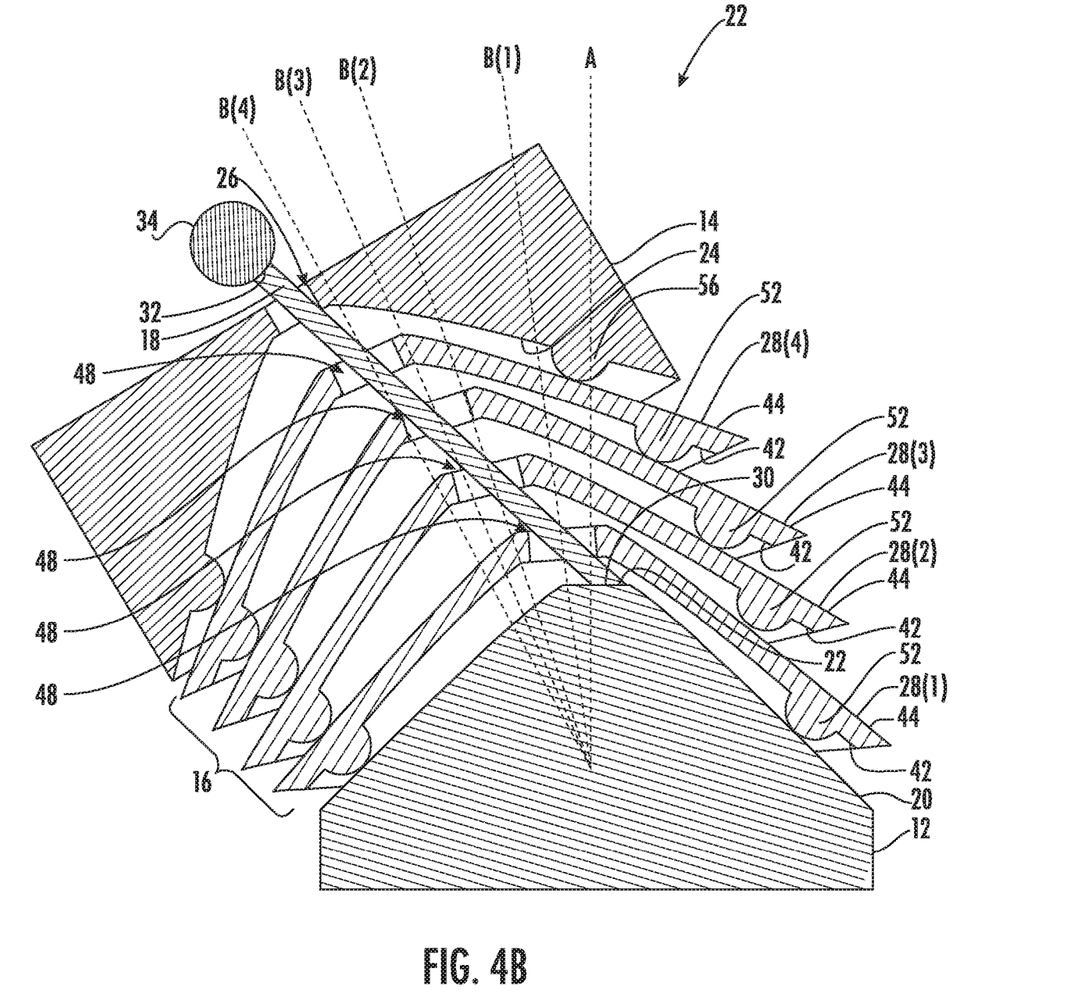
FIG. 4B is a cross-sectional side view of the mechanical joint of FIG. 1 in a bent orientation.

FIGS. 4A and 4B illustrate the mechanical joint 10 in a straight orientation and a bent orientation. Referring to FIG. 4A, the cone stack 16 is in a straight orientation. The cone stack 16 is configured to align the axis of each cone 28 with one another by a compressive force. The bottom connector 12 is at least partially nested within the first cone 28(1). The fourth cone 28(4) is at least partially nested within the top connector 14. Accordingly, compression of the top connector 14 toward the bottom connector 12 urges alignment of the cones 28 relative to one another along axis A of the bottom connector. In particular, for example, a first central axis B(1) of the first cone 28(1) relative to a second central axis B(2) of the second cone 28(2) are aligned by application of a compressive force urging the second cone 28(1) toward the first cone 28(2).

As noted above, the strand 18 extends from the bottom connector 12 through each of the apex holes 48 of the cones 28 in the cone stack 16, as well as through the through hole 26 of the top connector 14. Each spacer 52 offsets the surfaces 42, 44 of the cones 28 from each other and from the bottom connector 12 and the top connector 14. In particular, the first spacer 52 of the first cone 28(1) offsets the inner surface 42 of the first cone 28(1) from the outer surface 20 of the bottom connector 12 to create a gap therebetween. The second spacer 52 of the second cone 28(2) offsets the inner surface 42 of the second cone 28(2) from the outer surface 44 of the first cone 28(1) to create a gap therebetween. The same configuration is made for the remaining cones 28. The top connector 14 may also include a top spacer 56 configured to offset the inner surface 24 of the top connector 14 from the outer surface 44 of the fourth cone 28(4) to create a gap therebetween. It is noted that in certain embodiments, the first cone 28(1) may be fixed relative to the bottom connector 12 and/or the fourth cone 28(4) may be fixed relative to the top connector 14.

FIG. 4B is a view of the cone stack 16 of the mechanical joint 10 in a bent orientation. The cones 28 are configured to freely translate away from each other. The spacers 52 of the cones provide sufficient space between the inner surfaces 42 and the outer surfaces 44 of adjacent cones to allow relative tilting of the cones 28. In particular, the first spacer 52 of the first cone 28(1) offsets the inner surface 42 of the first cone 28(1) from the outer surface 20 of the bottom connector 12 to allow tilting movement of the first cone 28(1) relative to the bottom connector 12 (i.e., relative to a central axis A of the bottom connector 12). The second spacer 52 of the second cone 28(2) offsets the inner surface 42 of the second cone 28(2) from the outer surface 44 of the first cone 28(1) to allow tilting movement of the second cone 28(2) relative to the first central axis B(1) of the first cone 28(1) (i.e., relative to a first central axis A(1) of the first cone 28(1)). The same configuration is made for the remaining cones 28. Further, in certain embodiments, the top connector 14 may also include a top spacer 56 configured to offset the inner surface 24 of the top connector 14 from the outer surface 44 of the fourth cone 28(4) to allow free tilting movement of the top connector 14 relative to a fourth central axis B(4) of the fourth cone 28(4). The gaps created by the spacers 52, 56 provide sufficient room for tilting and allowing the spacers 52, 56 to move from one location on the outer surfaces 20, 44 to a different location on the outer surfaces 20, 44.

As noted above, the top connector 14 is configured to freely translate away from the bottom connector 12 (e.g., along axis A) and freely rotate (e.g., tilt, twist) relative to the bottom connector 12 (e.g., about axis A). Further, the top connector 14 is configured for compressive tilting relative to the bottom connector 12 for supported articulation of the top connector 14. The self-centering mechanism of the cone stack 16 restricts translations while minimizing resistance to rotation.

The dimensions of the cones 28 increase cone degree of motion and reduce actuating force for rotation. In certain embodiments, the cone design allows 13.7° of motion between cone contacts with a cone inclination angle of 45°.

In certain embodiments, only four cones are needed to provide a minimum of 45° of motion. In certain embodiments, seven cones are used. The number of cones 28 may be increased/decreased and the dimensions of the cones 28 may be altered depending on the application to increase/decrease a height of the cone stack 16, and/or increase/decrease a range of motion, etc.

Figure 5A:
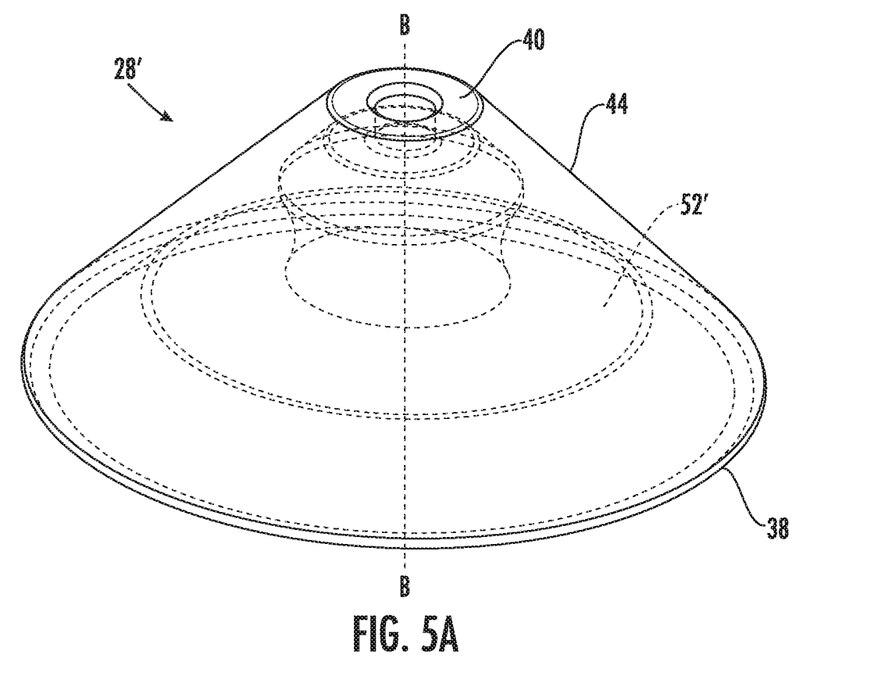
FIG. 5A is a perspective view of another embodiment of the cone of FIGS. 2A and 2B, the cone including a larger annular spacer.
Figure 5B:
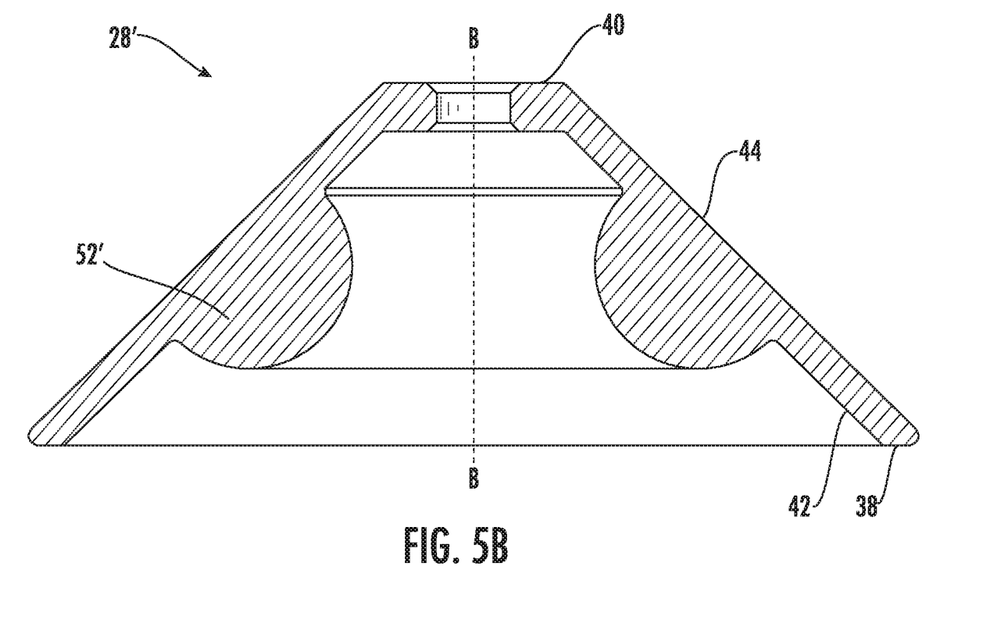
FIG. 5B is a cross-sectional side view of the cone of FIG. 5A.

FIGS. 5A and 5B are views of another embodiment of a cone 28' of the cone stack 16. In particular, the cone 28' includes a larger spacer 52' (i.e., with a larger radius), and which is positioned approximately midway between the lower rim 38 and the upper rim 40. The spacer 52' is an annular spacer extending around the central axis B.

Figure 6:
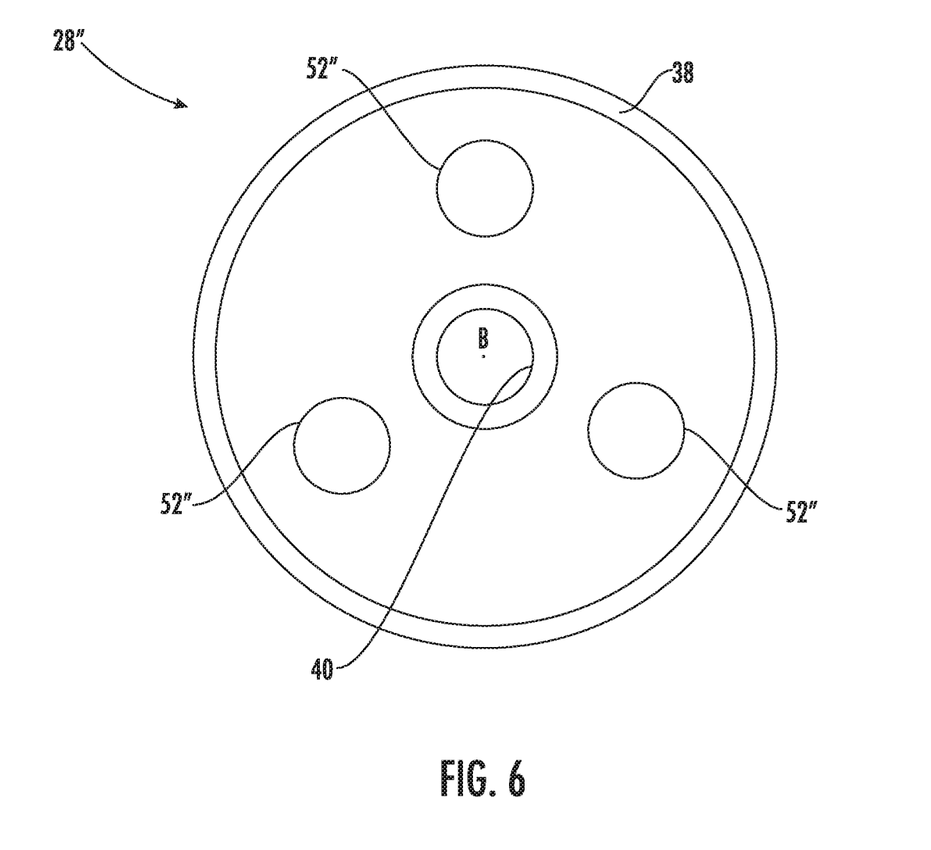
FIG. 6 is a bottom view of another embodiment of the cone of FIGS. 2A and 2B, the cone including a plurality of concentrically positioned spacers.

FIG. 6 is a bottom view of another embodiment of a cone 28" of the cone stack 16. The cone 28" includes a plurality of concentrically positioned spacers 52" at an interior surface 42 of the cone 28". In certain embodiments, the spacers 52" are spherical and/or have a rounded convex surface. In certain embodiments, the cone 28" includes at least three spacers 52", concentrically positioned around the central axis B, where the three spacers 52" provide relative stability between the cones 28". In other embodiments, a greater or lesser number of spacers 52" may be used. Providing fewer spacers 52" may decrease the frictional force between adjacent cones 28". However, more spacers 52" may spread out the stress on the spacers 52", which may increase the durability of the cone 28". Of course, any number or shape of spacers 52" may be used.

Figure 7:
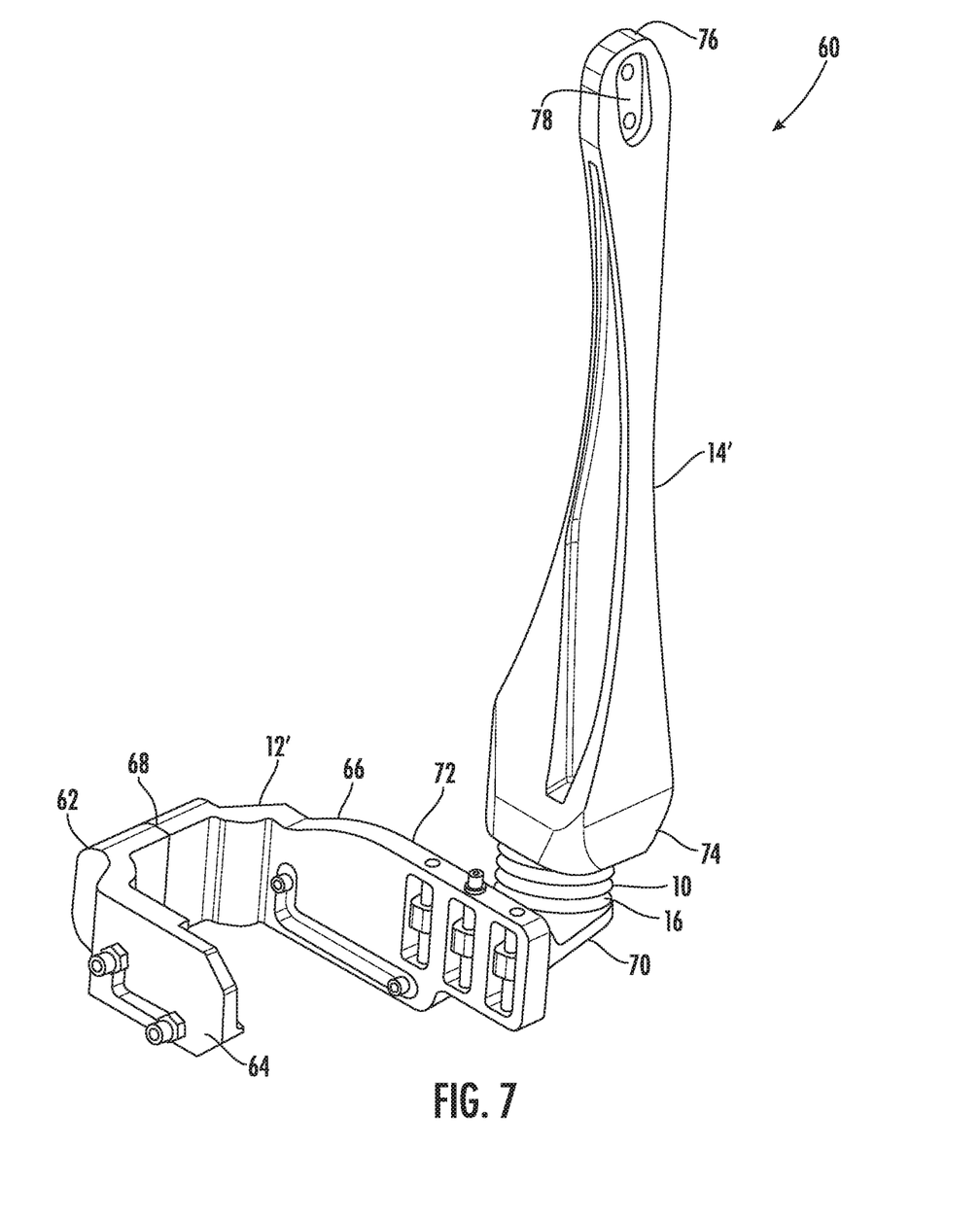
FIG. 7 is a perspective view of an exoskeleton ankle including the mechanical joint of FIG. 1.

FIG. 7 is a perspective view of an exoskeleton ankle 60 (may also be referred to as a compression resistant exoskeleton ankle) including the mechanical joint 10 of FIG. 1. The exoskeleton ankle includes a bottom connector 12', a top connector 14', a cone stack 16 positioned between the bottom connector 12' and the top connector 14', and a strand 18 (not shown) extending through the cone stack 16. The top connector 14' is configured to move relative to the bottom connector 12'. In particular, the top connector 14' is configured to freely translate away from the bottom connector 12' and freely rotate relative to the bottom connector 12'. The mechanical joint 10 provides vertical support of an exoskeleton structure while minimizing angular resistance about an ankle joint.

The bottom connector 12' of the mechanical joint 10 is configured to attach to the foot of the user below the ankle. In particular, the bottom connector 12' of the mechanical joint 10 is configured to attach to a heel of a shoe worn on the foot of the user below the ankle. The bottom connector 12' includes a clamp 62 having an instep portion 64 and an outstep portion 66 slidably connected to one another at sliding joint 68. Accordingly, the instep portion 64 is configured to contact an instep portion of the shoe of the user, and the outstep portion 66 is configured to contact an outstep portion of the shoe of the user. Compressing the shoe between the instep portion and the outstep portion secures the clamp 62 to the shoe. The bottom connector 12' further includes a platform 70 mounted to an outer surface 72 of the outstep portion 66 of the clamp 62. The platform 70 supports the cone stack 16.

The top connector 14' of the mechanical joint 10 is configured to attach to a leg and/or a leg mount of the exoskeleton above the ankle of the user. The top connector 14' is elongated and curved. The top connector 14' has a first end 74 contacting the cone stack 16 and a second end 76 comprising a mount 78 for mounting the top connector 14' to an exoskeleton worn by the user above the ankle of the user.

Figure 8A:
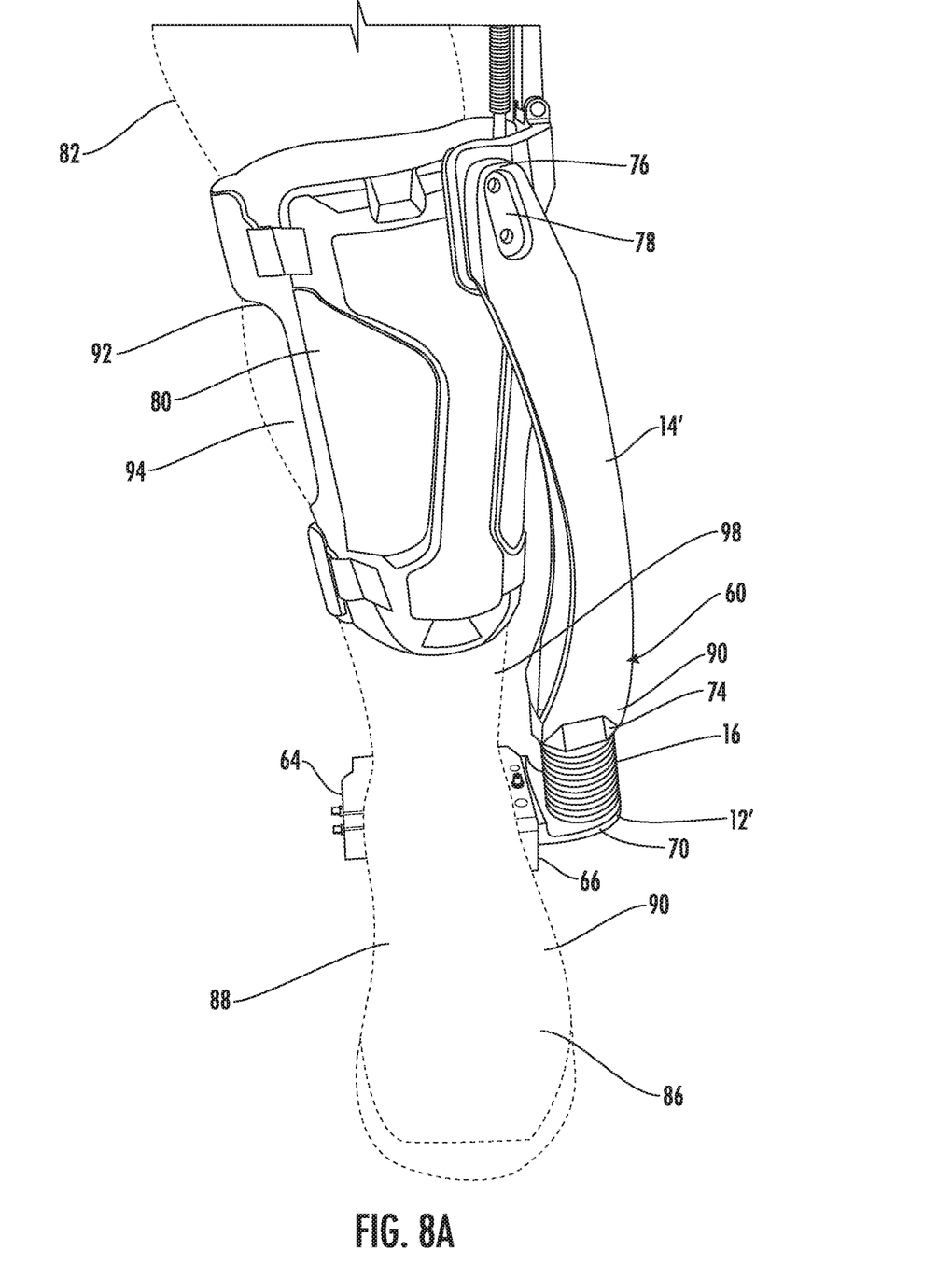
FIG. 8A is a front perspective view of the exoskeleton ankle of FIG. 7 mounted to a user.
Figure 8B:
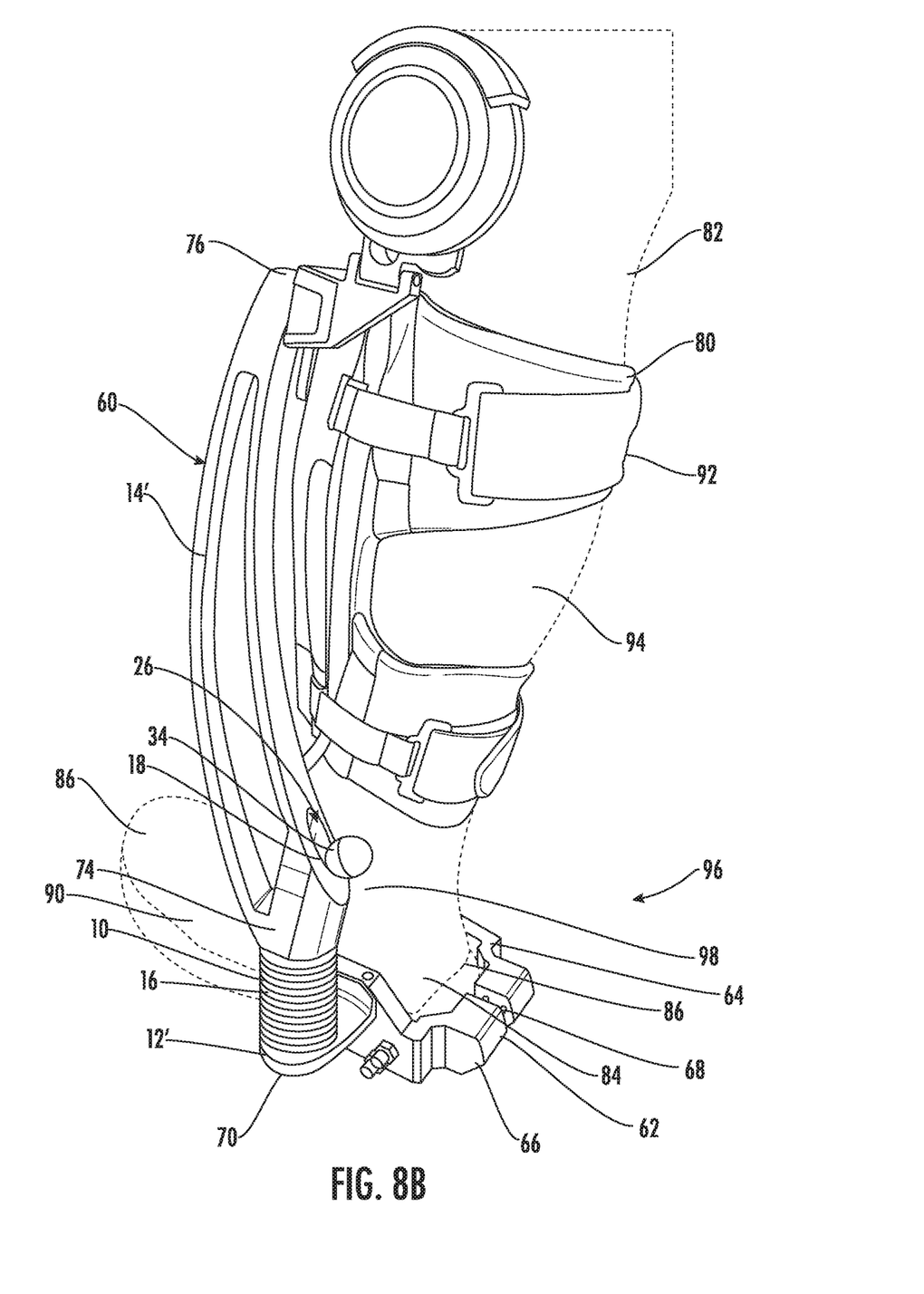
FIG. 8B is a side perspective view of the exoskeleton ankle of FIG. 8A.

FIGS. 8A and 8B are views of the exoskeleton ankle 60 mounted to an exoskeleton 80 and a user 82. The bottom connector 12' is mounted to a heel 84 of a shoe 86 of the user 82, with the instep portion 64 contacting an instep 88 of the shoe 86, and the outstep portion 66 contacting an outstep 90 of the shoe 86. Accordingly, the clamp 62 of the bottom connector 12' mounts the bottom connector 12' to the shoe 86 with the platform 70 at the outstep 90 of the shoe 86.

The top connector 14' is mounted to a center of a leg mount 92 of the exoskeleton 80 toward a top of a shin of a leg 94 of the user 82. However, it is noted that other attachment points or types of attachments can be used. As the top connector 14' is mounted to a center of the leg 94, the first end 74 of the top connector 14' is offset forward and sideways from the second end 76 of the top connector 14'. The top connector 18 includes a through hole 26' (or channel) proximate the first end 74 to allow the strand 18 to protrude through the through hole 26', with the stopper 34 above the through hole 26'.

The clamp 62 of the bottom connector 12' is configured to contact the ground 96. As a result, a force load travels from the leg mount 92 of the exoskeleton 80 through the top connector 14', through the cone stack 16, through the bottom connector 12' to the ground 96. Doing so prevents slippage of the exoskeleton 80 on the user 82 (e.g., by the leg mount 92 shifting downward).

The mechanical joint 10 and/or exoskeleton ankle 60 is configured to position the cone stack 16 at an outstep 90 of the foot of a user 82. The mechanical joint 10 is configured to resist vertically applied force of the exoskeleton 80, such as compressive forces (e.g., only downward and upward forces). The mechanical joint 10 is configured to allow rotation (e.g., tilting, twisting) of an ankle 98. The cone stack 16 is positioned at an outstep 90 of the foot for consistency with natural ankle movement. Generally, a foot has little range of motion to flex outward. As a result, the cone stack 16 minimally inhibits range of outward motion of a foot. However, the cone stack 16 also minimally inhibits range of inward motion of the foot because the cones 28 in the cone stack 16 simply separate from each other (but are maintained in alignment by the strand 18).

The mechanical joint 10 and/or the exoskeleton ankle 60 leverages the low-friction cone-on-a-cone architecture of the mechanical joint 10. When loaded, the self-centering cones 28 resist the vertically applied weight of the exoskeleton 80. However, by stacking several of these cones 28 on each other, the cones 28 are able to slide relative to each other without separating, which allows an acceptable range of motion in all other degrees of freedom. In particular, the exoskeleton ankle 60 provides an artificial bottom for the exoskeleton 80 while minimizing rotational (or angular) resistance of the ankle 98 (as the ankle 98 is not able to rotate outward). In other words, the exoskeleton ankle 60 emulates physiological joints on the exoskeleton 80 and follows the range of motion of the ankle 98 of the user 82. The exoskeleton ankle 60 supports lighter loads without creating undesired resistance to user movement. Moreover, the exoskeleton ankle 60 and the mechanical joint 10 allow for more tolerance in misalignment with the ankle 60 of the user 82. In particular, the exoskeleton ankle 60 is lightweight and prevents slippage in the exoskeleton 80, among other advantages (e.g., load transfer).

Although the exoskeleton ankle 60 is discussed in detail, it is noted that the mechanical joint 10 may be used in other applications. The mechanical joint 10 can be used for multiple degree of freedom joints other than ankles (e.g., hips, wrists, etc.).

Those skilled in the art will recognize improvements and modifications to the preferred embodiments of the disclosure. All such improvements and modifications are considered within the scope of the concepts disclosed herein and the claims that follow.

What is claimed is:

1. A mechanical joint, comprising:
a first connector;
a second connector;
a cone stack positioned between the first connector and the second connector, the cone stack comprising a first cone and a second cone, the first cone at least partially nested within the second cone; and
a strand extending through the second connector, the first cone, and the second cone;
wherein the second connector is configured to freely translate away from the first connector, and the second cone is configured to freely translate away from the first cone along the strand; and
wherein the second connector is configured to freely tilt relative to the first connector, and the second cone is configured to freely tilt relative to the first cone.

2. The mechanical joint of claim 1, wherein:
the first cone comprises a first wall having a first inner surface and a first outer surface, the first wall defining a first base hole, a first apex hole opposite the base hole, and a first central axis extending therebetween; and
the second cone comprises a second wall having a second inner surface and a second outer surface, the second wall defining a second base hole, and a second apex hole opposite the base hole, and a second central axis extending therebetween.

3. The mechanical joint of claim 2, wherein the strand extends through the first base hole, the first apex hole, the second base hole, and the second apex hole.

4. The mechanical joint of claim 2, wherein the first outer surface comprises a tapered conical surface.

5. The mechanical joint of claim 2, wherein the first cone and the second cone are configured to align the first axis of the first cone relative to the second axis of the second cone by application of a compressive force urging the first cone toward the second cone.

6. The mechanical joint of claim 2, wherein:
the first cone comprises at least one first spacer at the first inner surface of the first wall; and
the second cone comprises at least one second spacer at the second inner surface of the second wall.

7. The mechanical joint of claim 6, wherein the at least one second spacer of the second cone offsets the second inner surface of the second cone from the first outer surface of the first cone to allow tilting movement of the second cone relative to the first central axis of the first cone.

8. The mechanical joint of claim 6, wherein the at least one second spacer comprises an annular spacer.

9. The mechanical joint of claim 6, the at least one second spacer comprises at least three spacers concentrically positioned around the second axis.

10. The mechanical joint of claim 6, wherein the at least one second spacer comprises a convex rounded surface configured to contact the first outer surface of the first cone.

11. The mechanical joint of claim 1, wherein the strand further comprises a first end and a second end proximate the second connector, the mechanical joint configured to allow movement of the second end of the strand relative to the second connector.

12. The mechanical joint of claim 11, wherein the strand comprises a stopper at the second end to prevent disengagement with the second connector.

13. The mechanical joint of claim 11, wherein the first end of the strand is attached to the first connector to prevent movement of the first end of the strand relative to the first connector.

14. An exoskeleton ankle comprising:

a first connector;

a second connector;

a cone stack positioned between the first connector and the second connector, the cone stack comprising a first cone and a second cone, the first cone at least partially nested within the second cone; and a strand extending through the second connector, the first cone, and the second cone;

wherein the second connector is configured to freely translate away from the first connector, and the second cone is configured to freely translate away from the first cone along the strand; and wherein the second connector is configured to freely tilt relative to the first connector, and the second cone is configured to freely tilt relative to the first cone.

15. The exoskeleton ankle of claim 14, wherein the second connector is configured to attach to a leg of a user above an ankle.

16. The exoskeleton ankle of claim 15, wherein the second connector is configured to attached to a leg mount of an exoskeleton above the ankle of the user.

17. The exoskeleton ankle of claim 16, wherein the first connector is configured to attach to a heel of a shoe worn on the foot of the user below the ankle.

18. The exoskeleton ankle of claim 14, wherein the first connector is configured to attach to a foot of a user below an ankle.

19. The exoskeleton ankle of claim 14, wherein exoskeleton ankle is configured to position the cone stack at an outstep of the foot of the user below the ankle.

20. The exoskeleton ankle of claim 14, wherein the exoskeleton ankle is configured to resist a compressive force applied by an exoskeleton and allow ankle rotation.

* * * * *